United States Patent [19]
Raisanen

[11] Patent Number: 5,201,685
[45] Date of Patent: Apr. 13, 1993

[54] INTEGRAL AIR INTAKE APPARATUS

[75] Inventor: Niilo A. A. Raisanen, Cokato, Minn.

[73] Assignee: Raydot, Incorporated, Cokato, Minn.

[21] Appl. No.: 691,383

[22] Filed: Apr. 25, 1991

[51] Int. Cl.⁵ ............................................. F24F 13/10
[52] U.S. Cl. .................................. 454/259; 137/527.8
[58] Field of Search ........................... 137/527.6, 527.8;
  251/359; 454/254, 256, 259, 270, 275, 292, 304

[56] References Cited

U.S. PATENT DOCUMENTS

| | | | |
|---|---|---|---|
| 2,877,790 | 3/1959 | Wilhelm et al. | 137/527.6 X |
| 3,511,163 | 5/1970 | Newell et al | 454/304 |
| 4,210,070 | 7/1980 | Tatum et al. | 454/292 |
| 4,494,449 | 1/1985 | McCabe | 454/292 |
| 4,811,656 | 3/1989 | Meendering | 454/292 X |
| 4,850,265 | 7/1989 | Raisanen | 454/275 |

*Primary Examiner*—Harold Joyce
*Attorney, Agent, or Firm*—Palmatier, Sjoquist & Helget

[57] ABSTRACT

An integrally formed air intake apparatus for regulating air flow into a structure such as a barn. The air intake apparatus includes an elongate convex valve seat to minimize contact between the valve seat and its valve and to permit smooth air flow over the rounded valve seat. The apparatus further includes a duct-receiving groove for easily mounting a duct which directs outside air into the valve and a shoulder extending about the duct-receiving groove for bearing against an inner portion of the structure. The housing is molded from one-piece such that the valve seat, duct-receiving groove, and shoulder are integrally formed.

6 Claims, 3 Drawing Sheets

INTEGRAL AIR INTAKE APPARATUS

The present invention relates to an air intake apparatus for regulating air flow into a structure such as a barn and, more particularly, to such an air intake apparatus which is generally integrally formed.

BACKGROUND OF THE INVENTION

The Raisanen U.S. Pat. No. 4,850,265 discloses an air intake apparatus having a cupola directing outside air into a counterweighted valve, which opens and closes in response to static pressure in the structure upon which the cupola is mounted. The housing of the counterweight valve is formed of a plurality of bars and panels.

SUMMARY OF THE INVENTION

A feature of the present invention is the provision in an air intake apparatus for regulating air flow into a structure such as a barn, of the housing of the apparatus being integrally formed with a valve seat, a shoulder, and a duct portion means wherein the seat cooperates with a metering valve, the shoulder extends about an air outlet port for engaging structural components of the structure, and the duct portion mounts a duct for directing outside air into the air inlet port.

Another feature is the provision in such an air intake apparatus with a valve swingably mounted on the housing adjacent the air outlet port and responding to differential air pressure for allowing outside air through the outlet port and into the structure, of a valve seat adjacent the air outlet port and extending from the housing, wherein the valve seat includes an elongate convex portion which engages the valve when the valve is closed to minimize contact between the valve and valve seat.

Another feature is the provision in such an air intake apparatus, of a shoulder formed about the perimeter of the air outlet port for engaging inner structural components of the building in which the apparatus is affixed, wherein the shoulder extends from side edges of the valve such that insulation may confront the shoulder entirely about the duct.

Another feature is the provision in such an air intake apparatus, of means for readily mounting a duct on the housing for directing outside air into the air inlet port, wherein the duct mounting means includes a groove extending about the air inlet port for receiving the duct.

An advantage of the present invention is that the housing for the air intake apparatus is inexpensively, easily, and quickly fabricated. One of the features contributing to such an advantage is that the housing is plastic and typically molded from one piece.

Another advantage is that outside air directed into the air intake apparatus flows smoothly from the apparatus into the structure. One feature contributing to such an advantage is the convex portion of the valve seat. With the smooth rounded features of the seat minimizing turbulence, air flows further into the structure before settling.

Another advantage is that a duct or insulation collar may be more easily secured to such an air intake apparatus. One feature contributing to this advantage is an inner groove surrounding the air intake port in which the insulation collar may be mounted in an upright fashion without any connection means such as staples.

Another advantage is that the duct-receiving groove may cooperate with an adjacent upright portion of the air inlet port such that, if desired, a duct or insulation collar may also be secured to the upright portion with connection means such as staples.

Another advantage is that condensation is minimized. One feature contributing to such an advantage is that side portions of the shoulder extend away from side edges of the valves to allow insulation to confront the side portions of the shoulder and preclude drafts from contributing to condensation or the build-up of ice on the housing adjacent to the valves.

DETAILED DESCRIPTION OF THE PREFERRED EMBODIMENT

Figure 1:
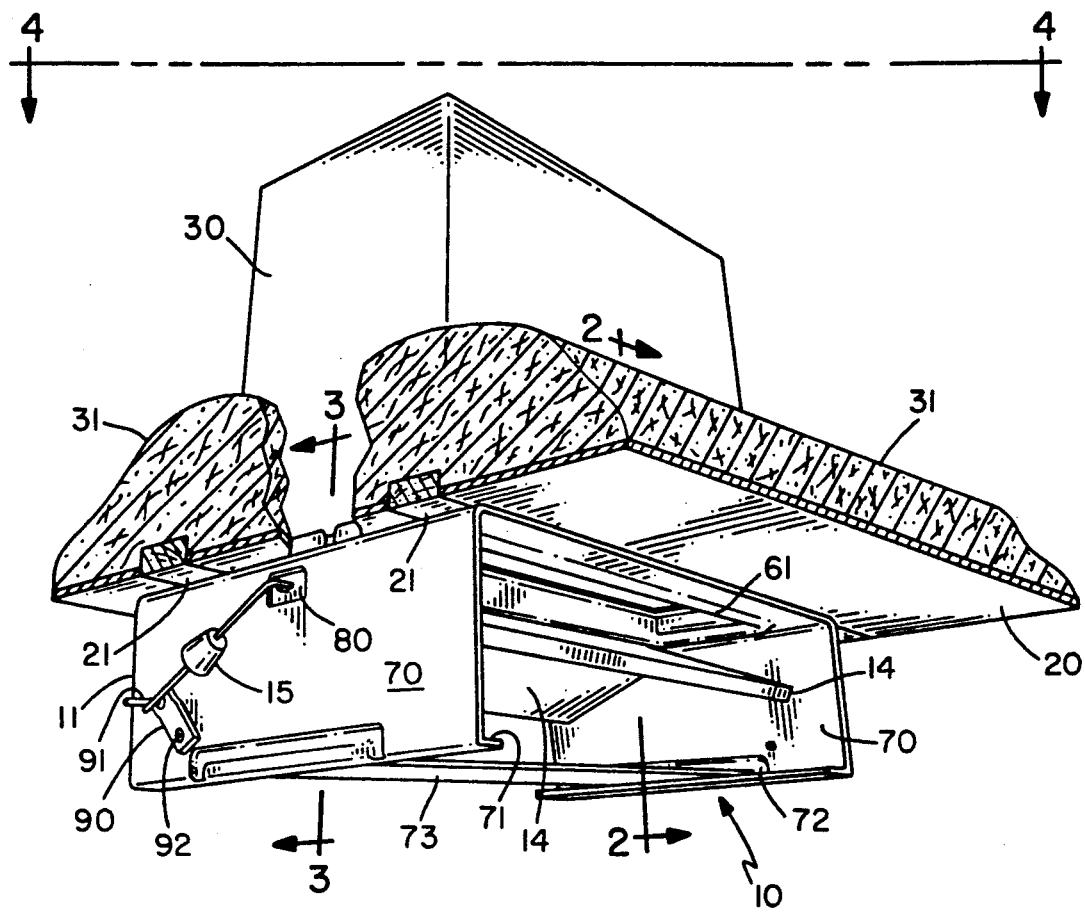
FIG. 1 is a perspective view of the present air intake apparatus affixed in a ceiling of a structure and to an insulation collar or duct.
Figure 2:
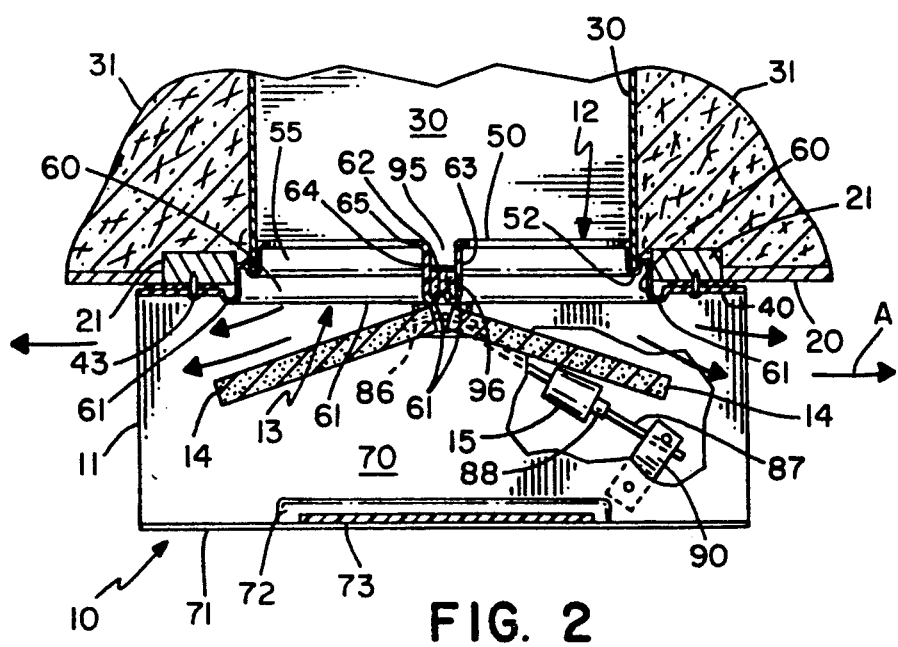
FIG. 2 is a section view at lines 2—2 of FIG. 1.
Figure 3:
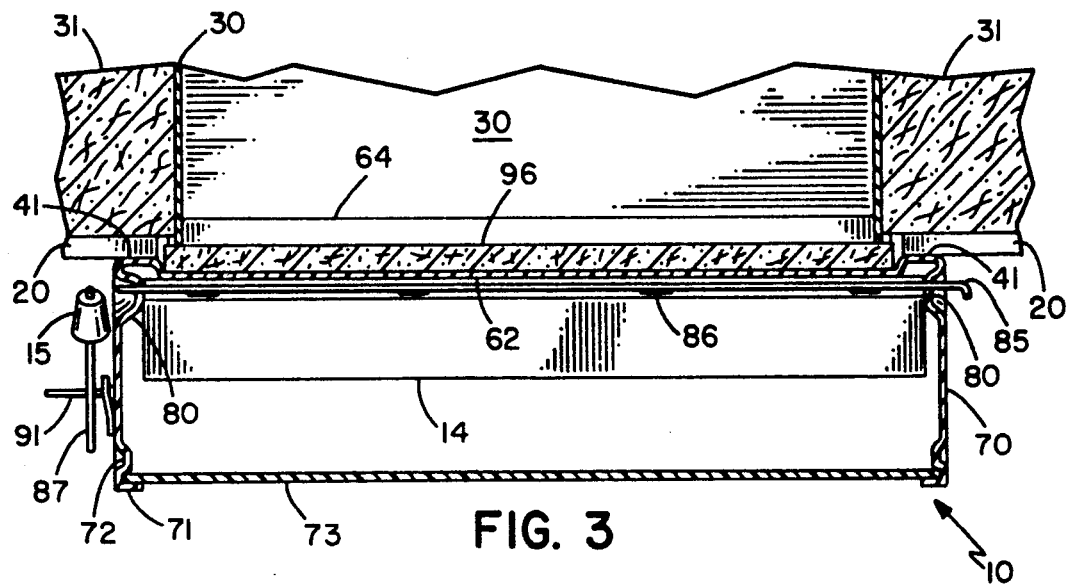
FIG. 3 is a section view at lines 3—3 of FIG. 1.
Figure 4:
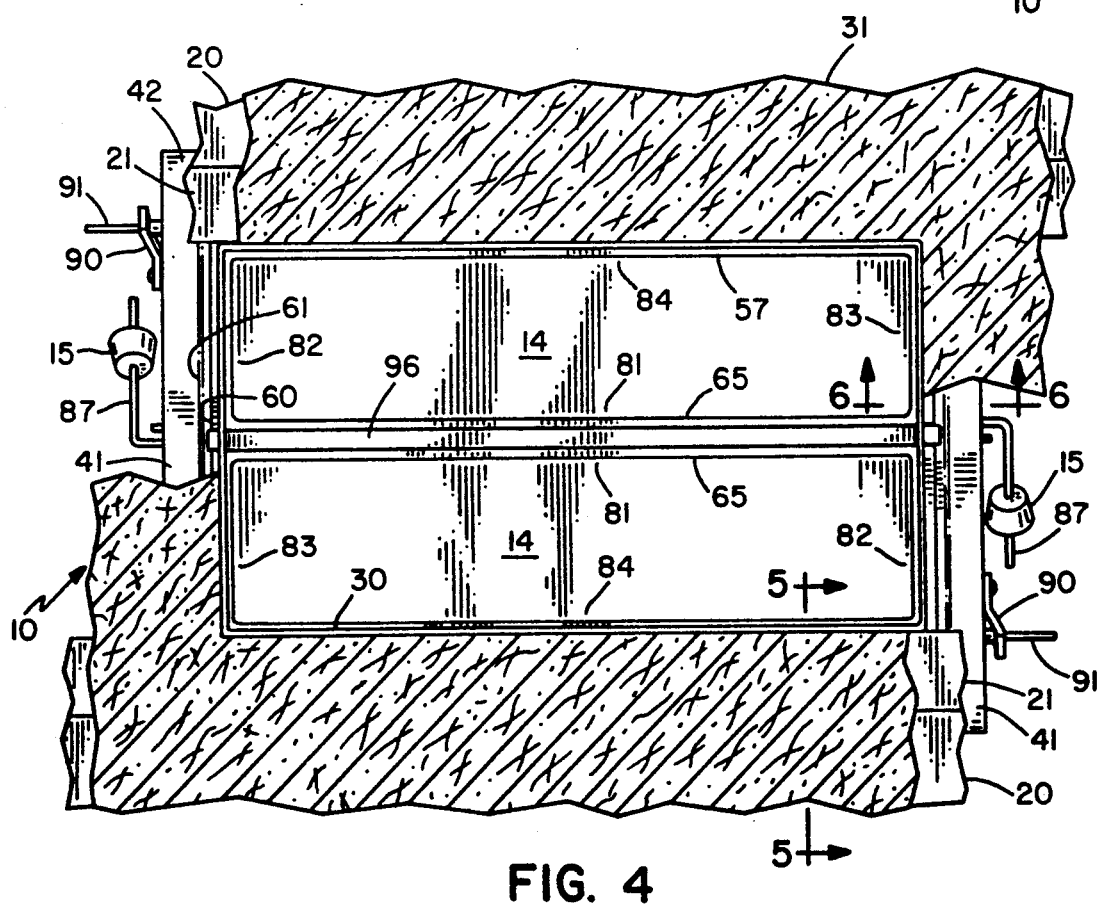
FIG. 4 is a top plan view of the apparatus at lines 4—4 of FIG. 1.
Figure 5:
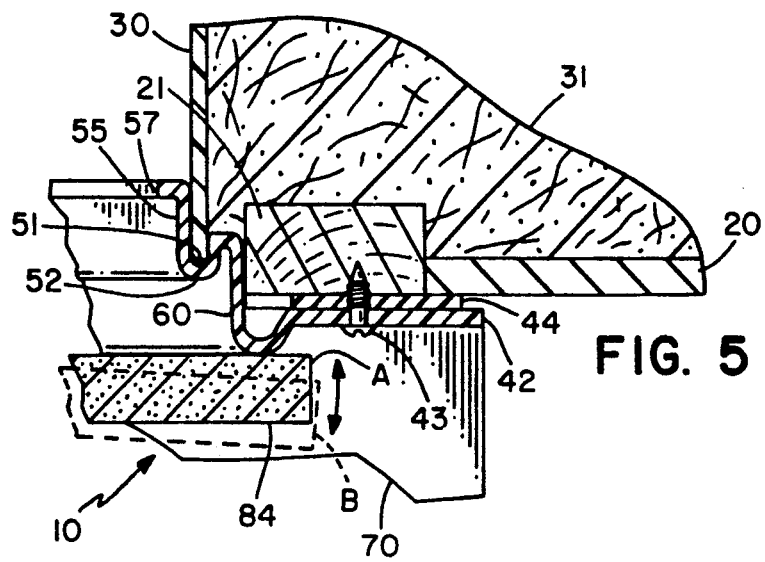
FIG. 5 is a detail section view at lines 5—5 of FIG. 4.
Figure 6:
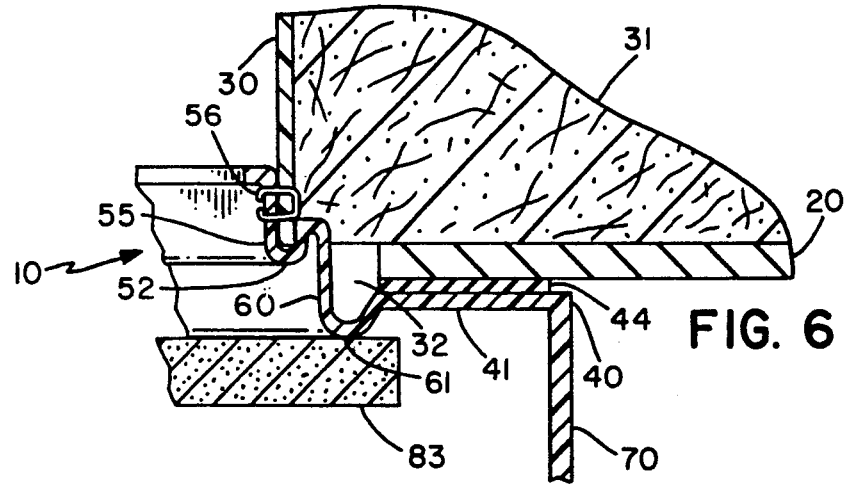
FIG. 6 is a detail section view at lines 6—6 of FIG. 4.

As shown in FIG. 1, the present air intake apparatus is indicated by the general reference number 10. It includes as its principal components an integral housing 11 forming a pair of air inlet ports 12 and a pair of air outlet ports 13, and a pair of valves or flaps 14 having counterweights 15 for regulating the opening and closing of the valves 14 relative to the air outlet ports 13.

The air intake apparatus 10 is typically mounted in a ceiling 20 of a structure such as a barn or warehouse. The ceiling 20 may be formed of plywood or steel. Such a ceiling 20 typically includes structural components such as furring strips or struts or truss beams 21. The apparatus 10 is typically mounted between two such beams 21 where a hole has been formed in the ceiling 20.

An insulation collar or duct portion 30 is mounted on the air intake apparatus 10 about the air inlet port 14 to form a portion of the duct means which conveys outside air to the air intake apparatus 10. Insulation 31 is typically found above the ceiling 20 and packed about the insulation collar 30. A space 32 formed between the apparatus 10, ceiling 20 and insulation 31 may also be filled with insulation 31, especially when such insulation is blown onto the ceiling 20. The ceiling 20 may abut the apparatus 10 with a more precise building construction.

The housing 11 includes an integral shoulder 40 for engaging the ceiling 20 and structural components such as the beams 21 and for allowing for imprecise building construction. The shoulder 40 is substantially rectangular in shape and extends entirely about the air outlet ports 13 in substantially one plane. Side portions 41 of the shoulder 40 are narrower than end portions 42 of the shoulder 40. Pin connectors 43 engaging the shoulder 40 secure the air intake apparatus 10 to the beams 21. A resilient sealing gasket 44 may be pinched between the shoulder 40 and the ceiling 20 and beams 21 to prevent undesirable drafts therebetween. The gasket 44 is typically rectangular in shape with side and end portions having widths slightly narrower than the respective side and end portions 41, 42 of the shoulder 40.

The side portions 41 of the shoulder 40 extend away from the side edges of the valves 14. The insulation 31 is thus allowed to confront the side portions 41, as well as the shoulder end portions 42, to minimize condensation on the shoulder 40 or other parts of the housing 11 adjacent to the valves 14.

A rippled portion 50 extends inwardly of the shoulder 40 to form three sides of each of the air inlet ports 12. The rippled portion 50 includes an inner groove or duct-fixing means 51 for mounting the insulation collar 30. The groove 51 is formed by an elongate convex portion 52 of the rippled portion 50. The curvature of the convex portion 52 contributes to smooth air flow through the apparatus 10.

An inner inlet port wall or duct portion 55 forms part of the rippled portion 50 and extends upwardly from the convex portion 52 to provide means for fixidly securing the insulation collar 30 with staples 56 or other pin connectors. Typically the groove 51 is of sufficient depth such that the insulation collar 30 stands upright without thee aid of pin connectors. However, the staples 56 may be used to provide a more secure means of fixing the insulation collar 30 to the apparatus 10. The port wall 55 includes an inwardly extending lip 57.

An outer port wall 60 forms part of the rippled portion 50 and extends downwardly from the convex portion 52 to a narrow convex valve seat 61 which engages the valve 14. The valve seat 61 is elongate and extends about all four sides of each of the outlet ports 13.

A double valve seat portion 62 includes the innermost portions of each of the valve seats 61. The double valve seat portion 62 is integral with port walls 63, 64 which in turn form the fourth sides of each of the inlet ports 12. Each of the walls 63, 64 includes a lip 65 which is integral with lip 57 of each respective port wall 55. It should be noted that each of the valve seats 61 provide an elongate, continuous, convex valve seat for one of the valves 14.

The convex valve seats 61, 62 provide a point or line of contact between the housing 11 and the valves 14 to minimize contact therebetween and minimize the chance of stuck or frozen valves or the formation of condensation on the seats 61, 62. The curvature of the seats 61, 62 also provide for a smooth flow of outside air through the apparatus 10, as by arrows A, so that the outside air gathers as little turbulence as possible. A smoother air flow through the apparatus 10 results in a greater horizontal flow of the outside air across the ceiling 20 before such air begins to lose its velocity and altitude.

A pair of sidewalls 70 depend integrally from the side portions 41 of the shoulder 40 to mount the valves 14 and direct outside air into a structure such as a barn. Each of the sidewalls 70 includes a bottom inwardly extending elongate flange 71 and and elongate indent 72 for engaging an opaque panel 73. The panel 72 rests upon the flanges 71 and is engaged from above by the indent 72. The purpose of the panel 73 is to provide a more aesthetically appealing apparatus 10 as such a panel 73 obstructs view of the valves 14 and other components when seen from the floor of a structure such as a barn.

Each of the sidewalls 70 further includes an integrally formed valve spacer 80 extending inwardly therefrom. Accordingly, side edges of the valves 14 are spaced from the sidewalls 70 to permit a free swinging of the valves 14.

Each of the valves 14 of the apparatus 10 is a rectangular flap or panel formed of Styrofoam ® which is a foam plastic with a high degree of insulation. Each of the flaps 14 include an inner edge portion 81, side edge portions 82, 83 and outer edge portion 84. Air flowing through the apparatus 10 flows in a direction generally parallel to the side edge portions 82, 83.

The valves 14 are swingably affixed to the apparatus 10 via a rod 85 extending through and between the spacers 80 of the sidewalls 70. Brackets 86 are affixed to and extend from the rods 85 into inner edges 82 of the flaps.

Each of the rods 85 includes an angle portion 87 on which the frustoconical counterweight 15 is adjustably slidable. The further the counterweight 15 is disposed away from its respective valve or flap 14, the greater amount of interior static pressure that is required to open the valve 14. A rubber-like adjustable cylindrical block 88 is slideable on and frictionally grips the rod portion 87 to set the position of the counterweight 15.

Stops 90 are affixed to the sidewalls 70 for engaging the angled rod portion 87 to control the degree to which the flap 14 opens. Each of the stops 90 includes a stop pin 91 for engaging the angled rod portion 87 and a pivot pin 92 for affixing each of the stops 90 to its respective sidewall 70 and for allowing the stop 90 to swing away from engagement with angled rod portion 87, whereupon the flap 14 is permitted to open more fully.

The double valve seat portion 62 and port walls 63, 64 define a groove 95 in which a strip 96 of insulation such as Styrofoam ® is inserted for insulating the valve seat 62. Without insulation strip 96, condensation or ice may form on the valve seat 62 and impair a sealing of the valves 14. Without insulation strip 96, condensation or ice may also form on the rods 85 and inner edges 81 of the valves to impair a swinging of the valves 14.

In operation, to affix the apparatus 10 to the ceiling 20, the insulation collar 30 is mounted in the groove 51 and if desired, stapled to the inner port wall 55. The apparatus 10, with the insulator collar 30, is then affixed to the ceiling 20 and beams 21 with pin connectors 43. The shoulder 40 engages, perhaps with the aid of gasket 44, the ceiling 20, furring 21 or other structural portions. Insulation may then be blown onto the ceiling 20 and be disposed about the insulation collar 30 and over the ceiling 20 or furring 21 which engage the shoulder 40. Accordingly, the duct or insulation collar 30 is insulated from the warmer shoulder 40 which lies below the ceiling 20 and in the warmer structure. To set the valve 14 to open at a predefined pressure differential in the structure in which the apparatus 10 is affixed, the counterweights 15 are slid to a predefined position on the angled rod portions 87. The stops 90 are then swung into an engagable position with the angled rod portions 87 or away from the rod portions 87 to a nonengageable position to aid in controlling the degree to which the flaps 14 open. Subsequently, as the static pressure in the structure reaches the predefined level, the flaps 14 are forced open from a closed, engaged position A to an open position B to allow air flow through the outlet port 13. The rounded features of the convex valve seats 61 and convex portion 52 minimize the formation of turbulence in such air flow, thereby allowing outside air to flow further into the structure horizontally before settling.

Figure 7:
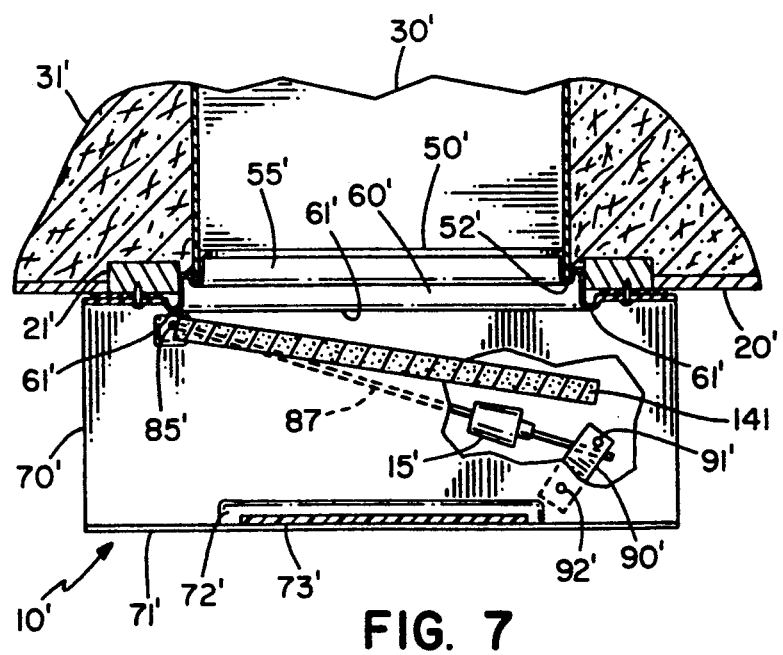
FIG. 7 is a section view of an alternative embodiment of the present invention.

In an alternate embodiment of the invention, an air intake apparatus 10' includes many of the same features as the above described air intake apparatus 10. These same features are denoted by the same reference numerals as described in relation to the air intake apparatus 10, except that the reference numerals in FIG. 7 include a prime symbol ('). As the air intake apparatus 10' includes only one port 14', the inner port walls 63, 64 are eliminated such that the rippled portion 50' extends about all four sides of the port 14'. The valve 14' engages all four sides of the valve seat 61' when closed.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An air intake apparatus for regulating air flow into a structure and for mounting a duct through which the air flows, comprising:
    a moldable plastic housing with air inlet and outlet ports, each of the ports including a periphery, the housing including a groove duct seat molded about the air inlet port periphery for seating the duct,
    a valve swingably mounted on the housing adjacent the air outlet port and responding to differential air pressure for allowing outside air through the outlet port and into the structure, the valve comprising a foam plastic panel for closing the air outlet port and an adjustable counterweight extending from the panel to set the valve for opening in response to the differential air pressure, and
    a valve seat portion engageable with the form plastic panel adjacent the air outlet port and extending from and being integrally formed and molded with the housing, the valve seat portion comprising an integrally formed and molded elongate convex portion which is disposed transversely of where the valve is swingably affixed to the housing and which engages the valve when the valve is closed to minimize contact between the valve and valve seat and to permit the air to flow smoothly over the valve seat portion.

2. The housing according to claim 1, wherein the elongate convex portion extends about the periphery of the air outlet port.

3. The apparatus according to claim 1 and the housing having an exterior surface, wherein the elongate convex portion is integrally formed with the housing such that the elongate convex portion forms a groove relative the exterior surface of the housing.

4. An air intake apparatus for regulating air flow into a structure and for mounting a duct through which the air flows, comprising
    a moldable plastic housing with air inlet and outlet ports, each of the ports including a periphery, the housing including a grooved duct seat molded about the air inlet port periphery for seating the duct, the housing further including a pair of molded sidewalls extending generally parallel to a direction of air flow,
    a valve swingably mounted on the housing adjacent the air outlet port and responding to differential air pressure for allowing outside air through the outlet port in the direction of air flow and into the structure, the valve having side edges extending generally parallel to the direction of flow, the valve mounted to and between the sidewalls, the valve comprising a foam plastic panel for closing the air outlet port, and an adjustable counterweight extending from the panel to set the valve for opening in response to the differential air pressure,
    a grooved valve seat adjacent the air outlet port and molded into the housing for engaging the valve, the valve seat including a periphery, and
    a should for engaging an inner portion of the structure and being molded integrally with the housing, the shoulder extending entirely about the air inlet port and valve seat periphery and extending away from the side edges of the valve, the grooved valve seat being disposed between the shoulder and the grooved duct seat to space the shoulder from the duct seat, the shoulder extending inwardly to the grooved valve seat which in turn extends inwardly into the grooved duct seat such that insulation may be disposed about the periphery of the air inlet port and confront the shoulder adjacent the side edges of the valve.

5. The apparatus according to claim 4, further comprising a gasket for being pinched between the shoulder and the inner portion of the structure.

6. An air intake apparatus for regulating air flow into a structure and for mounting a duct through which the air flows, comprising
    a housing with air inlet and outlet ports and a pair of transversely depending sidewalls, the side walls being integrally formed with the housing, the housing having exterior and interior surfaces, the housing being formed of molded plastic,
    a first duct portion on the housing for directing outside air into the air outlet port, the first duct portion comprising an inner groove extending about the air inlet port for seating a second duct portion, the first duct portion being integrally formed with the housing,
    a valve swingably mounted between the sidewalls of the housing adjacent the air outlet port and responding to differential air pressure for allowing outside air through the outlet port in a direction of travel and into the structure, the valve comprising a foam plastic panel for closing the air outlet port and an adjustable counterweight extending from the panel to set the valve for opening in response to the differential air pressure, the valve having side edges extending generally parallel to the direction of flow,
    a valve seat adjacent the air outlet port and extending from the housing, the valve seat comprising an elongate convex portion which engages the foam plastic panel when the valve is closed to minimize contact between the valve and valve seat, the elongate convex portion extending about the periphery of the air outlet port, the elongate convex portion being integrally formed with the housing, the elongate convex portion being formed by an outer groove relative an exterior surface of the housing, the outer groove being disposed outwardly of the inner groove, the valve seat including a periphery, and
    a shoulder for engaging an inner portion of the structure and being formed integrally with the housing, the shoulder extending entirely about the air inlet port and extending away from the side edges of the valve such that insulation may be disposed about the periphery of the air inlet port and confront the shoulder adjacent the side edges of the valve, the shoulder extending about the periphery of the valve seat, the shoulder leading integrally into the outer groove which in turn leads inwardly into the inner groove to space the shoulder from the second duct portion.

* * * * *

UNITED STATES PATENT AND TRADEMARK OFFICE
CERTIFICATE OF CORRECTION

PATENT NO. : 5,201,685
DATED : April 13, 1993
INVENTOR(S) : Niilo A. A. Raisanen It is certified that error appears in the above-identified patent and that said Letters Patent is hereby corrected as shown below:

Column 5, line 33, delete "form" and insert --foam--.

Column 6, line 6, delete "should" and insert --shoulder--.

Signed and Sealed this

Fourth Day of January, 1994

Attest:

BRUCE LEHMAN

*Attesting Officer*     *Commissioner of Patents and Trademarks*